(12) United States Patent
Sheng

(10) Patent No.: US 6,262,492 B1
(45) Date of Patent: Jul. 17, 2001

(54) CAR BATTERY JUMPER CABLE

(75) Inventor: Shyan-Fang Sheng, Yungho (TW)

(73) Assignee: DHC Specialty Corp., Taipei (TW)

( * ) Notice: Subject to any disclaimer, the term of this patent is extended or adjusted under 35 U.S.C. 154(b) by 0 days.

(21) Appl. No.: 09/345,769

(22) Filed: Jul. 1, 1999

(30) Foreign Application Priority Data

Apr. 9, 1999 (TW) ................................................ 88205510

(51) Int. Cl.[7] .................................................. H02J 7/00
(52) U.S. Cl. ...................... 307/10.1; 307/127; 320/165; 439/504
(58) Field of Search .................. 307/10.1, 127; 320/105, 165; 439/504

(56) References Cited

U.S. PATENT DOCUMENTS

| 4,400,658 | * | 8/1983 | Yates | 320/105 |
| 4,871,957 | * | 10/1989 | Taranto et al. | 320/105 |
| 5,993,250 | * | 11/1999 | Hayman | 439/504 |
| 6,140,797 | * | 10/2000 | Dunn | 320/105 |

* cited by examiner

Primary Examiner—Albert W. Paladini
(74) Attorney, Agent, or Firm—Bacon & Thomas, PLLC

(57) ABSTRACT

A car battery jumper cable for coupling an effective or charged power source to a battery (failed or not charged) accurately, which includes a relay switching circuit connected to the power source and the battery by two current conductor pairs, first and second voltage polarity recognition circuit respectively connected to the power source and the battery by a respective voltage conductor pair to recognize the polarity of the power source and the battery, a logic recognition circuit, which produces a control signal subject to the polarity of the power source and the battery, and a driving circuit controlled by the control signal from the logic recognition circuit to drive the relay switching circuit, enabling the two poles of the power source to be accurately coupled to the two poles of the battery.

8 Claims, 2 Drawing Sheets

CAR BATTERY JUMPER CABLE

BACKGROUND OF THE INVENTION

The present invention relates to a battery jumper cable, and more particularly to a car battery jumper cable which can automatically recognizes voltage polarity when installed, enabling a power source to be accurately coupled to the car battery to be rescued.

Following fast development of industry, a car has become the requisite transportation vehicle of most people. The power of a car is mainly provided by a car battery. If the battery of a car fails, or the engine of the car fails to charge the battery, the battery cannot provide the necessary working voltage to start the car. In such a case, a jumper cable may be used to couple a power source (normally, the battery of another car) to the battery of the car in trouble. A jumper cable for this purpose generally comprises a pair of conductors, and two pairs of clips at two opposite ends of each of the pair of conductors for connection to the positive and negative poles of the first-aid power source and the positive and negative poles of the car battery to be rescued, enabling the car battery to be charged by the power source.

When a jumper cable is used, the polarity connection between the first-aid power source and the car battery must be accurately confirmed. A polarity connection error may cause the car battery and the parts of the car to be damaged, or burned out, causing a catastrophe. The two conductors of a jumper cable are generally marked with different colors for quick recognition. However, if the color marks are covered with dirt or the jumper cable is used at night, the user may be unable to accurately recognize the polarity of the jumper cable, and a connection error may occur.

U.S. Pat. No. 4,769,586 discloses a jumper cable apparatus 10 which can automatically recognize the polarity of a battery. This structure of jumper cable apparatus 10 comprises two conductor pairs 16,18 for connection between two batteries 12,14. When installed, the jumper cable apparatus 10 recognize the polarity of the batteries 12,14 based on the current in the conductor pairs 16,18, and makes a switching operation, if necessary, to let the two poles of the first battery 12 be accurately coupled to the two poles of the second battery 14. Because this jumper cable apparatus recognize the polarity by means of detecting the voltage at the conductor pairs 16,18, it must intermittently detect the current at the conductor pairs 16,18, and use a complicated switching circuit to switch relays 36 during detection. Therefore, the reaction of this structure of jumper cable apparatus is slow. After installation, this jumper cable apparatus 10 takes much time to detect the connection of the clips 22,23,24,25 at the ends of the conductor pairs 16,18.

SUMMARY OF THE INVENTION

The main object of the present invention is to provide a simple, safety car battery jumper cable which can accurately couple a power source to the battery to be rescued. According to the preferred embodiment of the present invention, the car battery jumper cable comprise a relay switching circuit, first and second voltage polarity recognition circuits, a logic recognition circuit, and a driving circuit. The relay switching circuit is connected to the two poles of a first power supply device (the power source or the battery to be rescued) by a first current conductor pair, and connected to the two poles of a second power supply device (the battery to be rescued or the power source) by a second current conductor pair. The first voltage polarity recognition circuit is connected to the two poles of the first power supply device through a first voltage conductor pair to recognize the polarity of the first power supply device. The second voltage polarity recognition circuit is connected to the two poles of the second power supply device through a second voltage conductor pair to recognize the polarity of the second power supply device. The logic recognition circuit produces a control signal subject to the polarity of the first power supply device and the second power supplydevice. The driving circuit is controlled by the control signal from the logic recognition loop to drive the relay switching circuit, enabling the two poles of the first power supply device to be accurately coupled to the two poles of the second power supply device.

DETAILED DESCRIPTION OF THE PREFERRED EMBODIMENT

Figure 1:
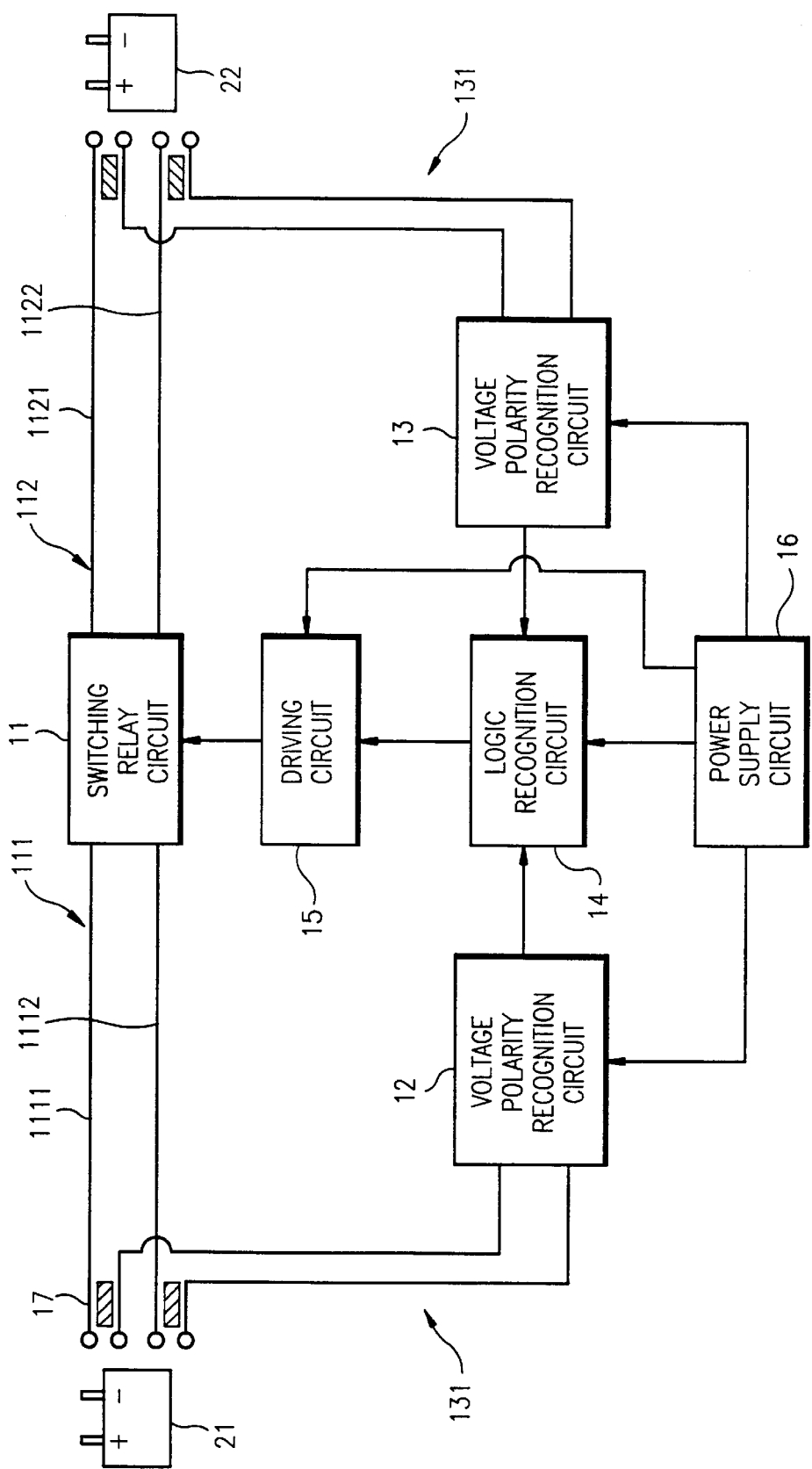
FIG. 1 is a block diagram showing the structure of a car battery jumper cable according to the present invention.

Referring to FIG. 1, a car battery jumper cable is shown, which is comprised of a relay switching circuit 11, a first voltage polarity recognition circuit 12, a second voltage polarity recognition circuit 13, a logic recognition circuit 14, a driving circuit 15, and a power supply circuit 16. The relay switching circuit 11 is connected to the positive and negative terminals of a first power supply device 21 through the two ends 1111 and 1112 of a first current conductor pair 111, and connected to the positive and negative poles of a second power supply device 22 through the two ends 1121 and 1122 of a second current conductor pair 112. If the first power supply device 21 is an effective power source, the second power supply device 22 shall be a battery to be rescued. On the contrary, if the first power supply device 21 is a battery to be rescued, the second power supply device 22 shall be an effective power source. By means of the connection of the relay switching circuit 11 between the first power supply device 21 and the second power supply device 22, the positive and negative poles of the power source, which is normally a battery, are accurately coupled to the battery to be rescued, enabling the power of the power source to be used to start the car (not shown).

The first voltage polarity recognition circuit 12 is connected to the positive and negative poles of the first power supply device 21 through the two ends of a first voltage conductor pair 121, and used to recognize the polarity of the first power supply device 21, and to produce a first polarity signal indicative of the recognized polarity. The second voltage polarity recognition circuit 13 is connected to the positive and negative poles of the second power supply device 22 through two ends of a second voltage conductor pair 131, and used to recognize the polarity of the second power supply device 22, and to produce a respective second polarity signal indicative of the recognized polarity. The first current conductor pair 111 and the first voltage conductor pair 121 are respectively connected to the positive and negative poles of the first power supply device 21 by a pair of isolation clips 17. The second current conductor pair 112 and the second voltage conductor pair 131 are respectively connected to the positive and negative poles of the second power supply device 22 by another pair of isolation clips 17. By means of the isolation clips 17, the voltage conductors for polarity detection and the current conductors for starting current are properly insulated. Therefore, when the isolation clips 17 are disconnected, the relay switching circuit 11 is immediately switched off to ensure a safety use.

The logic recognition circuit 14 starts logic processing subject to the first and second polarity signals produced by the first and second voltage polarity recognition circuits 12 and 13, so as to determine the polarity status of the first current conductor pair 111 and the second current conductor pair 112, and to produce a control signal for activating the driving circuit 15. The driving circuit 15 drives the relay switching circuit 11 subject to the control signal of the logic recognition circuit 14, enabling the two poles of the first power supply device 21 to be accurately coupled to the two poles of the second power supply device 22. However, when either of the isolation clips 17 is not properly connected, the relay switching circuit 11 will switch off the current conductors of all isolation clips 17 between the first current conductor pair 111 and the second current conductor pair 112, to ensure a safety use.

Figure 2:
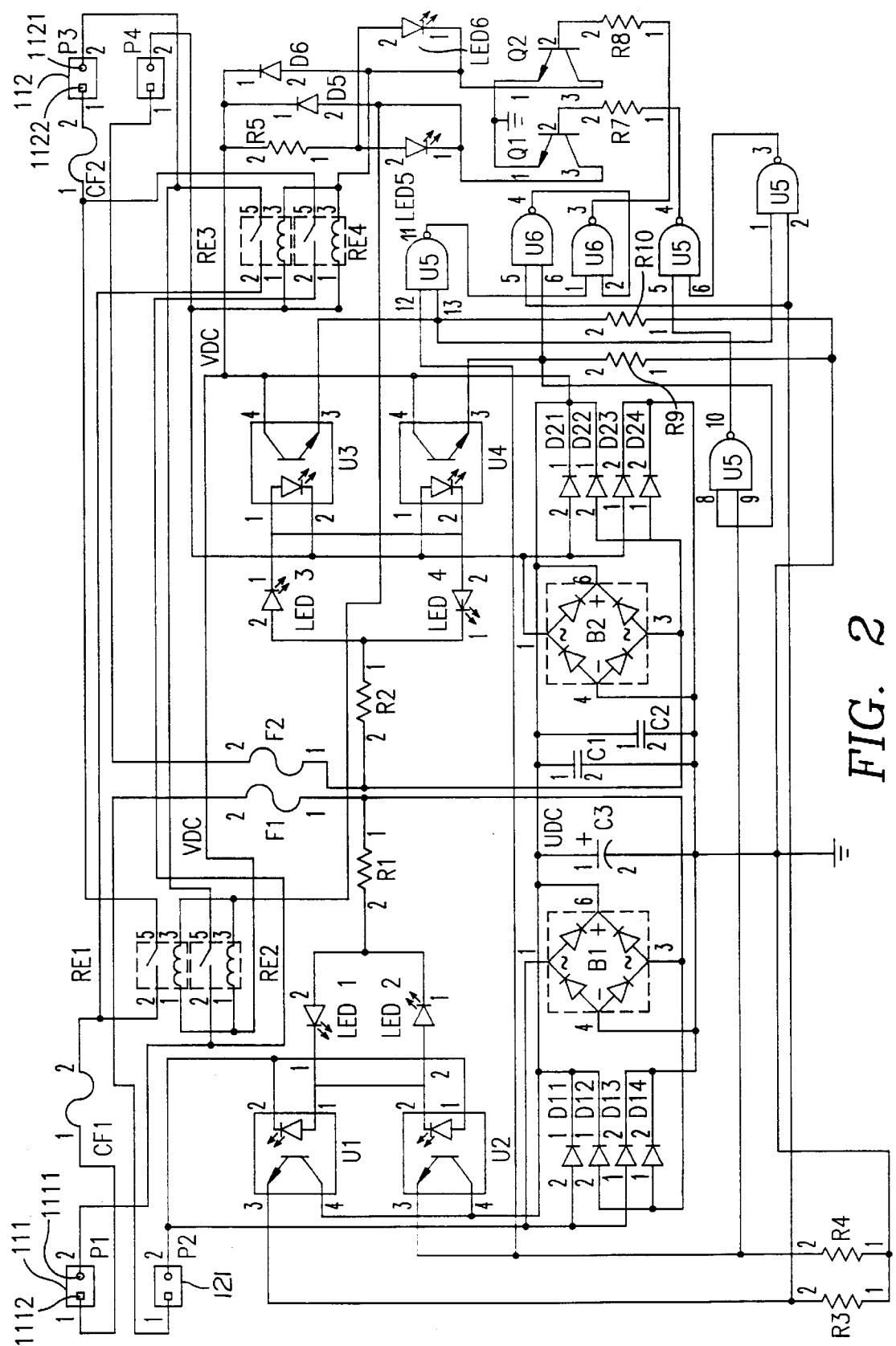
FIG. 2 is a detailed circuit diagram of the car battery jumper cable shown in FIG. 1.

The power supply circuit 16 uses diodes to filter power, so as to provide the necessary working power supply to the relay switching circuit 11, the first voltage polarity recognition circuit 12, the second voltage polarity recognition circuit 13, the logic recognition circuit 14, and the driving circuit 15, Referring to FIG. 2 and FIG. 1 again, the relay switching circuit 11 is comprised of relays RE1~RE4. The first relay RE1 is arranged between the second end 1111 of the first current conductor pair 111 and the first end 1122 of the second current conductor pair 112. The second relay RE2 is arranged between the first end 1112 of the first current conductor pair 111 and the second end 1121 of the second current conductor pair 112. The third relay RE3 is arranged between the second end 1111 of the first current conductor pair 111 and the second end 1121 of the second current conductor pair 112. The fourth relay RE4 is arranged between the first end 1112 of the first current conductor pair 111 and the first end 1122 of the second current conductor pair 112. If the polarity of the two ends 1111 and 1112 of the first current conductor pair 111 and the polarity of the two ends 1121 and 1122 of the second current conductor pair 112 meet, the third relay RE3 and the fourth relay RE4 are turned on, the first relay RE1 and the second relay RE2 are turned off. On the contrary, if the polarity of the two ends 1111 and 1112 of the first current conductor pair 111 and the polarity of the two ends 1121 and 1122 of the second current conductor pair 112 are reversed to each other, the first relay RE1 and the second relay RE2 are turned on, the third relay RE3 and the fourth relay RE4 are turned off. Therefore, no matter how the current and voltage conductor pairs 111,112, 121 and 131 are connected, the polarity of the first power supply device 21 are always accurately coupled to the second power supply device 22.

The first voltage polarity recognition circuit 12 comprises mainly two phototransistors U1 and U2, that are driven by the voltage at the first voltage conductor pair 121. The first voltage polarity recognition circuit 12 produces a first polarity signal indicative of the polarity of the first power supply device 21 according to the polarity of the voltage at the first voltage conductor pair 121. Similarly, the second voltage polarity recognition circuit 13 comprises mainly two phototransistors U3 and U4, that are driven by the voltage at the second voltage conductor pair 131. The second voltage polarity recognition circuit 13 produces a second polarity signal indicative of the polarity of the second power supply device 22 according to the polarity of the voltage at the second voltage conductor pair 131.

The logic recognition circuit 14 is comprised of a plurality of NAND gates U7 and U8. It makes logic operation processing subject to the aforesaid first polarity signal and second polarity signal, so as to produce a control signal for activating the two transistors Q1 and Q2 of the driving circuit 15. The first transistor Q1 of the driving circuit 15 is controlled to drive the first relay RE1 and the second relay RE2. The second transistor Q2 is controlled to drive the third relay RE3 and the fourth relay RE4. The relays RE1~RE4 are controlled by the transistors Q1 and Q2 to let the first power supply device 21 be accurately connected to the second power supply device 22, and the relays RE1~RE4 are at a open-circuit status to stop current conductor connection between the first current conductor pair 111 and the second current conductor pair 112 when either isolation clip 17 is not properly installed.

Further, the power supply circuit 16 is comprised of a capacitor C', and eight diodes D11~D14 and D21~D24. By means of the operation of the diodes to rectify the voltage of the battery or power source and the filter operation of the capacitor C', the necessary working voltage is provided to all circuits of the car battery jumper cable.

As indicated above, the car battery jumper cable can accurately couple the two poles of the first-aid power supply to the two poles of the battery to be rescued. Because the voltage conductors for polarity detection and the current conductors for starting current are separately installed, the circuit for detecting power source and battery status has a simple structure and provides a quick reaction. This design automatically breaks off the connection of the current conductors when either isolation clip is not properly installed, so that a safety use is ensured.

Although the present invention has been explained in relation to its preferred embodiment, it is to be understood that many other possible modifications and variations can be made without departing from the spirit and scope of the invention as hereinafter claimed.

What the invention claimed is:

1. A car battery jumper cable used to connect a first power supply device to a second power supply device, enabling two poles of said first power supply device to be accurately coupled to two poles of said second power supply device, the car battery jumper cable comprising:

a first relay switching circuit connected to the two poles of said first power supply device through a first current conductor pair, and connected to the two poles of said second power supply device through a second current conductor pair;

a first voltage polarity recognition circuit connected to the two poles of said first power supply device through a first voltage conductor pair to recognize the polarity of said first power supply device, and to produce a first polarity signal indicative of the polarity of said first power supply device;

a second voltage polarity recognition circuit connected to the two poles of said second power supply device through a second voltage conductor pair to recognize the polarity of said second power supply device, and to produce a second polarity signal indicative of the polarity of said second power supply device;

a logic recognition circuit, which produces a control signal subject to the first polarity signal from said first voltage polarity recognition circuit and the second polarity signal from said second voltage polarity recognition circuit;

a driving circuit controlled by the control signal from said logic recognition circuit to drive said relay switching circuit, enabling the two poles of said first power supply device to be accurately coupled to the two poles of said second power supply device;

said first current conductor pair and said first voltage conductor pair are connected to said first power supply device by a first pair of isolation clips, said second current conductor pair and said second voltage conductor pair are connected to said second power supply device by a second pair of isolation clips;

said relay switching circuit drives the current conductors of the isolation clips between said first current conductor pair and said second current conductor pair into an open-circuit status when one of said isolation clips is not accurately installed;

a power supply circuit for providing the necessary working power to said relay switching circuit, said first voltage polarity recognition circuit, said second voltage polarity recognition circuit, said logic recognition circuit, and said driving circuit;

said relay switching circuit comprises a first really arranged between the second end of said first current conductor pair and the first end of said second current conductor pair, a second relay arranged between the first end of said first current conductor pair and the second end of said second current conductor pair, a third relay arranged between the second end of said first current conductor pair and the second end of said second current conductor pair, and a fourth relay arranged between the first end of said first current conductor pair and the first end of said second current conductor pair; and said second voltage polarity recognition circuit comprises two phototransistors driven by the voltage at said second voltage conductor pair to produce a second polarity signal indicative of the polarity of said second power supply device.

2. The car battery jumper cable of claim 1 wherein said logic recognition circuit is comprised of a plurality of logic gates for processing the first polarity signal from said first voltage polarity recognition circuit and the second polarity signal from said second voltage polarity recognition circuit, so as to produce said control signal.

3. The car battery jumper cable of claim 2 wherein said logic gates are NAND gates.

4. The car battery jumper cable of claim 2 wherein said driving circuit comprises a first transistor controlled by the control signal from said logic recognition circuit to drive said first relay and said second relay, and a second transistor controlled by the control signal from said logic recognition circuit to drive said third relay and said fourth relay.

5. The car battery jumper cable of claim 4 wherein said power supply circuit is comprised of a capacitor, and a plurality of diodes.

6. The car battery jumper cable of claim 5 wherein said first power supply device is an effective power source, and said second power supply device is a battery to be rescued.

7. The car battery jumper cable of claim 5 wherein said first power supply device is a battery to be rescued, and said second power supply device is an effective power source.

8. A car battery jumper cable used to connect a first power supply device to a second power supply device, enabling two poles of said first power supply device to be accurately coupled to two poles of said second power supply device, the car battery jumper cable comprising:

a first relay switching circuit connected to the two poles of said first power supply device through a first current conductor pair, and connected to the two poles of said second power supply device through a second current conductor pair;

a first voltage polarity recognition circuit connected to the two poles of said first power supply device through a first voltage conductor pair to recognize the polarity of said first power supply device, and to produce a first polarity signal indicative of the polarity of said first power supply device;

a second voltage polarity recognition circuit connected the two poles of said second power supply device through a second voltage conductor pair to recognize the polarity of said second power supply device, and to produce a second polarity signal indicative of the polarity of said second power supply device;

a logic recognition circuit, which produces a control signal subject to the first polarity signal from said first voltage polarity recognition circuit and the second polarity signal from said second voltage polarity recognition circuit;

a driving circuit controlled by the control signal from said logic recognition circuit to drive said relay switching circuit, enabling the two poles of said first power supply device to be accurately coupled to the two poles of said second power supply device;

said first current conductor pair and said first voltage conductor pair are connected to said first power supply device by a first pair of isolation clips, said second current conductor pair and said second voltage conductor pair are connected to said second power supply device by a second pair of isolation clips;

said relay switching circuit drives the current conductors of the isolation clips between said first current conductor pair and said second current conductor pair into an open-circuit status when one of said isolation clips is not accurately installed;

a power supply circuit for providing the necessary working power to said relay switching circuit, said first voltage polarity recognition circuit, said second voltage polarity recognition circuit, said logid recognition circuit, and said driving circuit;

said relay switching circuit comprises a first relay arranged between the second end of said first current conductor pair and the first end of said second current conductor pair, a second relay arranged between the first end of said first current conductor pair and the second end of said second current conductor pair, a third relay arranged between the second end of said first current conductor pair and the second end of said second current conductor pair, and a fourth relay arranged between the first end of said first current conductor pair and the first end of said second current conductor pair; and said first voltage polarity recognition circuit comprises two phototransistors driven by the voltage at said first voltage conductor pair to produce a first polarity signal indicative of the polarity of said first power supply device.

* * * * *